United States Patent [19]

Skinner et al.

[11] 4,258,982
[45] Mar. 31, 1981

[54] LENS CELL

[75] Inventors: James R. Skinner, Saratoga; John D. Lytle, San Jose, both of Calif.

[73] Assignee: M. U. Engineering & Mfg., Inc., Mountain View, Calif.

[21] Appl. No.: 41,949

[22] Filed: May 24, 1979

[51] Int. Cl.³ .............................................. G02B 7/02
[52] U.S. Cl. ..................................... 350/252; 350/438
[58] Field of Search ....................... 350/175 NG, 252; 353/100; 354/286

[56] References Cited

U.S. PATENT DOCUMENTS

| | | | |
|---|---|---|---|
| 3,508,807 | 4/1970 | Mayer | 350/252 X |
| 3,784,287 | 1/1974 | Grey | 350/175 NG X |
| 3,877,792 | 4/1975 | Cox et al. | 350/175 NG X |

FOREIGN PATENT DOCUMENTS

| | | | |
|---|---|---|---|
| 2302353 | 7/1974 | Fed. Rep. of Germany | 350/252 |
| 1467285 | 3/1977 | United Kingdom | 350/252 |

Primary Examiner—F. L. Evans
Attorney, Agent, or Firm—Flehr, Hohbach, Test, Albritton & Herbert

[57] ABSTRACT

Lens cell for carrying a lens element of the type having spaced apart parallel planar registration faces on opposite ends thereof and at least one sidewardly extending tab, and comprising a cell body having a cylindrical wall defining an optical axis for the lens element. The cylindrical wall is formed with an annular inwardly extending protrusion providing an annular planar lens element seating surface facing one end of the cell body, the cylindrical wall has at least one slot formed therein and opening through said one end thereof whereby the lens element can be inserted into the cell body with one registration face in engagement with the annular seating surface and with its tab registered in said slot. A retainer is secured to said cell body and has an annular seating surface forming a registration surface for the other registration face of the lens element.

21 Claims, 4 Drawing Figures

U.S. Patent     Mar. 31, 1981     4,258,982
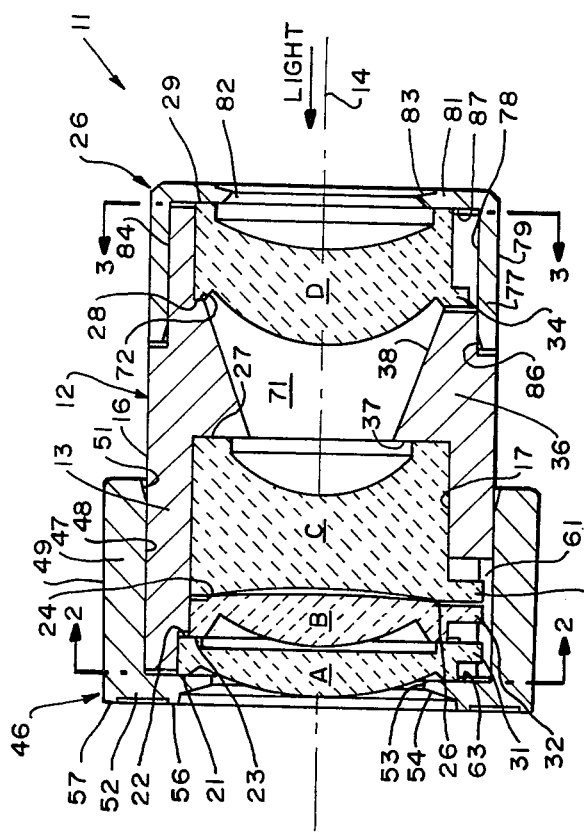
FIG.—1
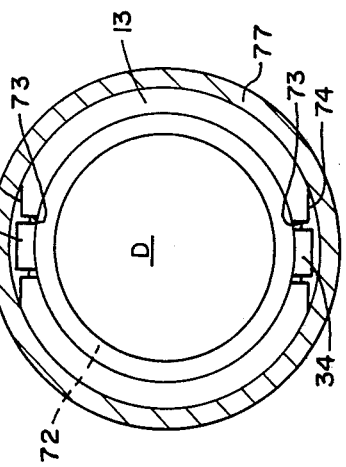
FIG.—3
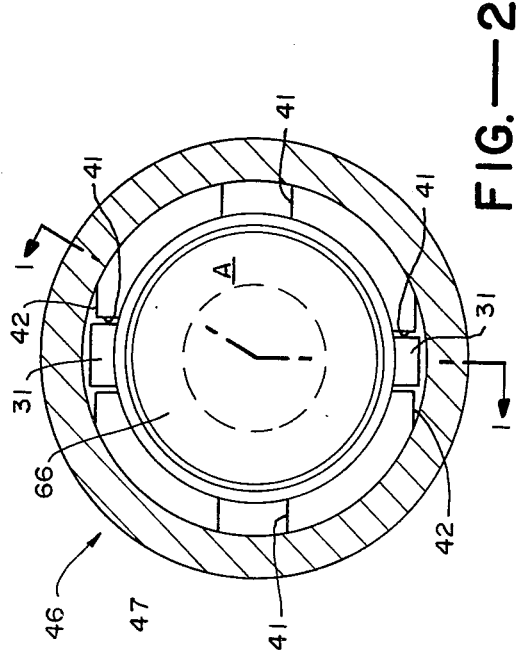
FIG.—2
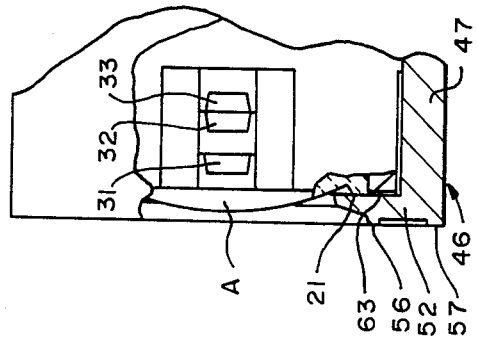
FIG.—4

LENS CELL

This invention relates to a lens cell and more particularly to a lens cell which is adapted for receiving one or more plastic lens elements.

Although plastic lens elements have heretofore been provided, typically they have been designed with lower figures of accuracy than is usually required for precision glass lenses. This, however, is not necessarily any longer the case. In addition, the lens cells in which plastic lens elements have been mounted in the past have not had the desired precision for supporting such lens elements with accuracy to meet the full capabilities of now available high quality plastic lens elements. There is, therefore, need for a new and improved lens cell.

In general, it is an object of the invention to provide a lens cell which can be utilized for mounting and aligning the lens elements with great accuracy.

Another object of the invention is to provide a lens cell of the above character in which the lenses are registered in three planes.

Another object of the invention is to provide a lens cell of the above character which is particularly adapted for use with plastic lens elements.

Another object of the invention is to provide a lens cell of the above character which is constructed to provide clearances in two directions for gate protrusions carried by the lens elements.

Another object of the invention is to provide a lens cell of the above character which is particularly adapted for multi-element lenses.

Another object of the invention is to provide a lens cell of the above character in which the lens elements are captured in the lens cell and are firmly held in place.

Another object of the invention is to provide a lens cell of the above character which can accommodate lens elements having at least a pair of parity tabs thereon of different widths to ensure that the lens elements are inserted in the proper manner into the lens cell.

Another object of the invention is to provide a lens cell of the above character in which the critical dimensions with respect to the lens elements can be readily maintained.

Another object of the invention is to provide a lens cell of the above character which has been designed for an optimized simplified manual assembly with the lens elements therein.

Another object of the invention is to provide a lens cell of the above character which can be assembled without the use of glues or adhesives.

Another object of the invention is to provide a lens cell of the above character which minimizes the compression loads placed on the individual lens elements after assembly into the lens cell.

Additional objects and features of the invention appear from the following description and which the preferred embodiment is set forth in detail with the accompanying drawing.

FIG. 1 is a side elevational view in cross section of a lens cell incorporating the present invention and having mounted therein a multi-element lens assembly along the line 1—1 of FIG. 2.

FIG. 2 is a cross sectional view taken along the line 2—2 of FIG. 1.

FIG. 3 is a cross sectional view taken along the line 3—3 of FIG. 1.

FIG. 4 is a view of a portion of the lens which is shown in FIG. 1 with certain portions broken away.

In general, the lens cell of the present invention is provided for mounting a lens element of the type having registration faces on opposite ends thereof and at least one sidewardly extending tab. A cell body is provided having a cylindrical wall defining an axis for the lens element and having open ends. The wall is formed with an inwardly extending angular protrusion providing a first annular lens seating surface lying in a plane perpendicular to said axis and facing one end of said cell body. The cylindrical wall has at least one slot formed therein and opening through said one end whereby a lens element can be seated in the cell body with one registration face in engagement with said annular seating surface and with its tab registered in said slot. A first retainer is secured to the cell body and retains the first lens element in the cell body. It has an annular seating surface forming a registration surface for the other registration face of the first lens element. The cylindrical wall can be provided with a plurality of slots extending through one end of the same to provide a castellated end which, in combination with the retainer, forms a collet assembly which captures the lens element to bring it into registration with the axis of the cell body.

More in particular, the lens cell 11 which is shown in the drawings consists of a cell body 12 that is generally in the form of a right cylinder. It is provided with a cylindrical wall 13 which defines an optical axis 14. The cylindrical wall is provided with an outer cylindrical surface 16 and an inner cylindrical surface 17. The cell body 12 is provided with open ends as shown.

The lens cell 11 as hereinafter pointed out is provided for mounting one or more lens elements and as shown can be used for mounting a multi-element lens assembly such as the all plastic projection lens assembly with aspheric surface disclosed in co-pending application, Ser. No. 914,395, filed on June 12, 1978, in the name of John D. Lytle, one of the inventors named herein. As disclosed therein, such a lens assembly can consist of lens elements A, B, C and D having a specific design as set forth in said co-pending application. As disclosed therein, the design is for an all plastic lens assembly. As is well known to those skilled in the art of molding plastics, and in the molding of such plastics, there remains a gate protrusion on each plastic part which is molded. In order for the lens elements A, B, C and D to be mounted within the lens cell 11 of the present invention, each of the lens elements is provided with annular planar parallel spaced apart registration surfaces on opposite sides. Thus, lens element A is provided with outer and inner planar parallel registration faces 21 and 22. Lens element B is provided with similar registration faces 23 and 24. Lens element C with registration faces 26 and 27 and lens element D with registration faces 28 and 29. Each of the lens elements is provided with at least one outwardly projecting tab and preferably, as shown in the drawings, each is provided with a pair of tabs extending diametrically of the lens element. These tabs 31 can be termed parity tabs. The two tabs 31 of the pair are of different widths in a direction perpendicular to the optical axis of the lens. They are spaced apart a suitable distance, as for example 180°. Similarly, lens element B is provided with tabs 32, lens element C with tabs 33 and lens element D with tabs 34. When the lens elements are of molded plastic, a gate protrusion for each of the lenses remains and extends from the lens element at point of 90° from each of the tabs.

In order to accommodate the lens elements of the type hereinbefore described, the cylindrical walls 13 of the cell body 12 is provided with an annular inwardly extending ledge or protrusion 36 intermediate the ends of the cell body which has formed thereon, a generally centrally disposed planar lens seating surface 37 formed symmetrically about the axis 14 and which faces towards one of the open ends of the cell body 12. The ledge 36 is provided with a conical tapered surface 38.

The lens element C is sized in such a manner so that it can be slipped into the cell body 12 and fit within the inner cylindrical surface 17 with a very small clearance so that its annular registration face 27 can be moved into engagement with the lens seating surface 37 to precisely register the lens C in one plane. In order to accommodate the tabs 33 provided on the lens element, there is provided at least one and preferably three or more as, for example, four slots 41 in the end of cell body 12 towards which the lens seating surface 37 faces. The slots 41 are spaced 90° apart. Flats 42 are formed in the outer cylindrical surface 16 and overlie two of the four slots 41 which extend through the outer and inner surfaces of the cylindrical wall 13. The flats 42 are provided in order to make it possible for the fingers of the hand to be utilized for grasping the tabs of the lens elements as, for example, the tabs 33 of the lens element C and for positioning the lens element C within the cell body with its registration surface 27 in engagement with the lens seating surface 37. The slots 41 have different widths to accommodate the tabs 32.

In assembly, the lens element can be positioned in the cell body 12 by grasping its tabs 32 by the fingers and positioning the tabs 32 in the slots 41 with the proper width tab 32 in the slot 41 of the corresponding width and moving the registration face 24 into engagement with the other registration face 26 of the lens element C so that the lens element C is one plane. The tabs 31 for the lens element A can then be grasped and inserted into the cell body 12 in a similar manner so that its registration face 22 comes into engagement with the other registration face 23 of the lens element B to also position it in one plane. By using tabs of unequal widths on the lens elements, assurance is obtained that the lens elements are properly oriented in the lens cell and with respect to each other. The gate protrusion for each lens element extends in an unused slot 41 and thus will not affect the positioning of the lens element.

A retainer 46 is provided for retaining the lens elements A, B and C within the cell body 12 and is in the form of a cylindrical end cap formed by a cylindrical wall 47 that is provided with an inner cylindrical surface 48 which is sized so that it can slip over the outer cylindrical surface 16 of the cell body 12. It is also provided with an outer cylindrical surface 49. The inner cylindrical surface 48 is provided with a chamfer 51 on the inner surface adjacent the outer extremity of the wall 47 to facilitate slipping the retainer 46 over the end of the cell body 12. The retainer 46 is provided with a circular end wall 52 formed integral with the side wall 47. The end wall 52 is provided with a centrally disposed opening 53 which serves as an aperture. The end wall 52 is also provided with annular inner and outer rings 56 and 57 which serve as bearing surfaces for the ultrasonic horn which introduces energy into the retainer so that the retainer can be bonded by shear ultrasonic welding to the body. In the construction shown in FIG. 1, it can be seen that there was adequate clearance provided between the outer extremities of the plugs 31, 32 and 33 as provided by the space 61 in a dimension extending diametrically of the tabs 31 through 34 so that there is adequate clearance for any gate protrusion carried by the outer extremities of the tabs. Similarly, there is clearance provided between each of the tabs 31, 32 and 33 so that there is also adequate clearance in another direction at right angles to the first named direction for any extension of the protrusion in a direction which is at right angles to the diametrical extension of tab. By providing these clearances in two directions, it can be seen that the protrusion carried by the extremities of the tabs 31 through 33 cannot upset the precise dimensions provided by the registration faces of the lens elements and by the lens seating surface 37 carried by the cell body and by a lens seating surface 63 carried by the end wall 52 of the retainer 46.

As thus far described, it can be seen that the slots 41 provided in the end of the cell body 12 make it possible to obtain access to the tabs carried by the lens elements to facilitate the installation of the lens elements in the cell body with the proper orientation. In addition, the slots 41 provide clearances for the protrusions carried by the tabs in the three X, Y and Z planes. In addition, the slots 41 serve to provide a castellated end portion, the portions of the cylindrical wall 13 extending between the slots 41 are depressed inwardly to firmly engage the lens elements and to capture the same to remove any clearance between the cylindrical wall 13 and the lens elements and to thereby center the lens elements on the optical axis 14 and at the same time to ensure that the lens elements are maintained in true parallelism with respect to the precision lens seating surface 37. Thus, it can be seen that the retainer 46 in combination with the castellated end portion of the cell body 12 forms a collet assembly for capturing the lens elements and retain the same with the cell body 12. Thus, it can be seen in the assembly hereinbefore described that the lens seating surface 37 serves as a starting datum for the three lens elements A, B and C. The ledge 36 which is provided serves as a light baffle to prevent any stray light from entering the lens cell and bouncing on the outer portion of the lens element C.

By utilization of ultrasonic welding and introducing ultrasonic energy through the cylindrical area of the retainer 46, it is ensured that a minimum amount of ultrasonic energy will be introduced into the lens portion to prevent possible distortion of the lens elements.

Between lens elements B and C it can be seen that there is a very small clearance which makes it difficult to utilize a conventional metal aperture stop in the lens assembly. Therefore, in connection with the present lens assembly, an annular ring 66 of a suitable material such as black foil is stamped onto the lens element C.

The spacing between lens elements C and D is critical. As shown, a substantial air space 71 is provided between the lens element C and D. Another annular planar lens seating surface 72 parallel to the surface 37 is formed in the cell body 12 and faces the other end of the cell body 12. This lens seating surface 72 is adapted to be engaged by the registration face 28 of the lens element D to precisely position the lens element D with respect to the lens element C in one plane. In order to accommodate the tabs 34 on the lens element D, the other end portion of the cell body 12 is also provided with at least one slot and preferably three or more slots as, for example, four slots 73 spaced 90° apart which extend through the inner and outer cylindrical surfaces 16 and 17 of the cell body 12. Flats 74 are provided on two diametrically opposed slots 73 to facilitate grasping of the tabs 34 in the same manner as described in connection with the flats 42 to facilitate insertion of the lens element D into the cell body. A retainer 76 is provided for retaining the lens element D within the cell body and it also is in the form of an end cap and is provided with a cylindrical side wall 77 having inner and outer surfaces 78 and 79. It is provided with an end wall 81 having a centrally disposed opening 82 therein which forms an aperture for the entrance of light as indicated in FIG. 1. The opening is defined by an annular knife edge 83 formed on the inner margin of the end wall 81.

The end of the cell body 12 on which the retainer 46 is mounted is provided with an annular recess 84 which is adapted to receive the retainer 76 in such a manner so that the outer surface 79 is flush with and in alignment with the outer surface 16 of the cell body 12. The outer extremity of the inner surface 78 is provided with a chamfer 86 to facilitate insertion of the retainer over the end of the cell body 12. The end wall 81 is provided with a lens seating surface 87 which is adapted to engage the registration face 29 of the lens element D.

As with the retainer 46, the retainer 76 in combination with the castellated end portion of the cell body 12 serves to form a collet assembly for capturing the lens element D by depressing inwardly the wall portion between the slots 73 to remove any clearance between the outer extremities of the lens element D and the wall portions and to cause registration of the lens element in the optical axis 14 to capture the lens elements D within the cell body 12.

As hereinbefore pointed out, the lens elements A, B, C and D can all be formed of plastic. Similarly, the parts of the lens cell hereinbefore described also can all be formed of plastic so that the lens cell 11 with all the lens elements mounted therein are all formed of plastic.

The plastic can be any suitable material such as phenylene oxide which is black in color and is 20% glass filled. Using such a material, all the parts can be injection molded.

With a lens cell construction in the manner hereinbefore described, it has been found that the lens elements can be maintained on an optical axis within one thousandths of an inch. This is made possible by the precise registration surfaces carried by the lens cell and by the lens elements and for accommodating in two dimensions, any gate protrusions carried by the parts. In connection with the foregoing construction, it should be noted that the end caps of retainers 46 and 76 have not been provided with slots. It has been found that the retainers themselves are flexible enough to accommodate any gate protrusion carried by the lens elements. However, it should be appreciated if this is found to be objectionable that slots can also be formed in the side walls of the retainers 46 and 76.

It should be appreciated that at the time that the ultrasonic energy is introduced into the retainer 46, the retainer 76 can also be shear welded to the cell body so that a unitary assembly can be readily formed without danger of introducing an undue amount of ultrasonic energy into the lens elements which could possibly cause distortion of the same.

Even though the lens cell has been described in connection with a multi-element lens assembly, the same principles of construction can be utilized with a single element lens assembly by utilizing a cell body with the castellated construction hereinbefore described in connection with the retainer to capture the lens element within the cell body and to precisely maintain its registration in the cell body in the manner hereinbefore described.

It is apparent from the foregoing that there has been provided a lens cell formed of plastic which has the capability of mounting lens elements in such a manner so as to meet the full capabilities of now available high quality plastic lens elements. The construction of the lens cell is such so as to optimize and simplify manual assembly of the lens elements in the lens cell. No glues or adhesives are utilized. Use of the parity tabs on each lens element having different widths ensures that the lens elements will be properly and precisely mounted within the lens cell. The assembly of the lens elements in the lens cell minimizes the compression loads upon the lens elements. The use of the collet construction for mounting the lens elements ensures that the lens elements will not be pinched so as to make them non-symmetric. The tabs on the lens elements ensure that the lens elements will be properly oriented in the cell. In addition, the tabs make it possible to handle the lenses by hand and facilitate assembly of the lens elements into the lens cell without the use of special fixtures or tooling. In addition, the tabs minimize the chances for human contamination of the optical surfaces of the lens element during assembly of the lens elements into the lens cell.

What is claimed is:

1. In a lens cell for carrying a lens element of the type having spaced apart parallel planar registration faces on opposite ends thereof and at least one sidewardly extending tab, a cell body having a cylindrical wall defining an optical axis for the lens element, said wall being formed with an annular inwardly extending protrusion and providing an annular planar lens element seating surface facing one end of the cell body, said cylindrical wall having at least one slot formed therein and opening through said one end thereof whereby the lens element can be inserted into the cell body with one registration face in engagement with the annular seating surface and with its tab registered in said slot and a retainer secured to said cell body and having an annular seating surface forming a registration surface for the other registration face of the lens element.

2. A lens cell as in claim 1 wherein said lens element is provided with a pair of diametrically extending tabs and wherein said cell body is provided with a pair of diametrically extending slots, said wall having flats formed on the outer surfaces thereof centered on said slots whereby said tabs on the lens element can be grasped and positioned in said slots.

3. A lens cell as in claim 2 wherein said slots and said tabs are of different widths to ensure proper orientation of the lens element in the lens cell.

4. A lens element as in claim 1 wherein said cylindrical wall is provided with a plurality of slots to provide a castellated end portion and in which said castellated end portion in combination with said retainer serve as a collect assembly to capture said lens element.

5. In a lens cell for mounting a multi-element lens assembly in which each of the lens elements is provided with spaced apart planar parallel registration faces at opposite ends thereof and a pair of diametrically extending tabs extending sidewardly therefrom, a cell body having a cylindrical wall having an optical axis for the lens elements, said wall being formed with an inwardly extending annular protrusion forming a first annular lens element seating surface lying in a plane perpendicular to the optical axis and facing one end of said cell body, said cylindrical wall having a pair of diametrically extending slots formed therein and opening through said one end of said cell body whereby a first lens element can be seated in the cell body with one registration face in engagement with said annular seating surface and with its tabs registered in said slots and whereby a second lens element can be seated in cell body with one registration face in engagement with the other registration face of the first lens element and with its tabs registered in said slots and a first retainer secured to said cell body for retaining first and second lens elements in said cell body, said retainer having a lens seating surface adapted to engage the other registration face of the said second lens element.

6. A lens cell as in claim 5 wherein the tabs on the lens elements have different widths and the slots have different widths to ensure proper orientation of the lens elements in the lens cell.

7. A lens cell as in claim 5 wherein the outer surface of said cylindrical wall is provided with a pair of flats in registration with said slots and wherein said tabs carried by said first and second lens elements have a length so that they extend through said slots and to slightly beyond said flats.

8. A lens cell as in claim 7 wherein a clearance is provided between the retainer and the ends of the tabs and wherein the registration faces of the lens elements are positioned in such a manner so that there is spacing provided between the tabs of the first and second lens elements whereby gate protrusions carried by the lens elements have clearance provided for the same.

9. A lens cell as in claim 8 wherein the body is formed to receive a third lens element with one registration face in engagement with the other registration face of the second lens element and wherein the lens seating surface of the retainer engages the registration face of the third lens element.

10. A lens cell as in claim 9 wherein said retainer is provided with an opening overlying the first, second and third lens elements to define an aperture.

11. A lens cell as in claim 10 wherein said cylindrical wall is formed with a second annular lens seating surface lying in a plane perpendicular to the optical axis and facing the opposite end of said cell body, said cylindrical body having at least a pair of diametrically extending slots formed therein and opening through the other end of the cell body whereby an additional lens element can be seated in the cell body with a registration face engaging said second annular seating surface and with its tabs seated in said slots opening through the other end of said cell body and a second retainer secured to said cell body and adapted to retain said second lens element in said cell body and having an annular seating surface adapted to engage said registration face of said additional lens element.

12. A cell body as in claim 11 wherein said second retainer is provided with an opening overlying said additional lens elements and forming an aperture.

13. A lens cell as in claim 12 wherein a plurality of slots are provided in each end of the cell body to provide castellated ends on the cell body so that the castellated ends in combination with the retainers serve as collet assemblies to more evenly distribute the clearances between the lens elements and the cell body and to center the lens elements on the optical axis.

14. A lens cell as in claim 13 wherein said cell body and said first and second retainers are constructed in such a manner so as to provide clearances for any gate protrusions carried by the tabs of the lens elements, said clearance being in two planes.

15. A lens cell as in claim 14 wherein the first and second retainers are in the form of end caps and wherein the outer extremities of the inner surfaces of the end caps are provided with chamfers to facilitate slipping the retainers over the ends of the cell body.

16. A lens cell as in claim 15 formed essentially of plastic.

17. A lens cell as in claim 16 wherein the first and second retainers are secured to the cell body by ultrasonic shear welds.

18. The combination of a lens cell and a lens element, the lens element comprising a lens body having first and second spaced apart parallel planar registration faces on opposite ends thereof and having diametrically extending tabs extending sidewardly therefrom, the lens cell comprising a cell body having a cylindrical wall defining an optical axis for the lens element, said wall being formed with an inwardly extending annular protrusion and having formed thereon a lens element seating surface lying in a plane perpendicular to the optical axis and facing one end of the lens cell, said cylindrical wall having a pair of diametrically opposed slots formed therein and opening through said one end, said lens element being disposed within said lens cell and having one registration face in engagement with the lens element seating surface and with the tabs disposed in the slots and a cap-like retainer secured to said cell body, said retainer having a lens element seating surface formed thereon and forming a registration surface for the other registration face of the lens element, said retainer having an opening therein forming an aperture.

19. The combination as in claim 18 wherein the outer surface of the cylindrical wall is provided with flats which are in registration with slots, said tabs on said lens element extending through said slots and into the space provided by said flats but being spaced from said retainer.

20. The combination as in claim 19 together with an additional lens element having spaced apart planar parallel registration faces on opposite ends thereof and a pair of diametrically extending tabs carried thereby, said second lens element being mounted in said cell body with one registration face being in engagement with the other registration face of the first named lens element, wherein the tabs of the second lens element are disposed in the slots, and wherein the lens seating surface carried by the retainer forms a registration surface for the other registration face of said second lens element.

21. The combination as in claim 18 wherein the tabs of the lens elements having different widths and the slots have different widths to ensure proper orientation of the lens elements in the lens cell.

* * * * *